United States Patent [19]
Gee, Jr.

[11] Patent Number: 4,722,302
[45] Date of Patent: Feb. 2, 1988

[54] HAY FEEDING APPARATUS

[76] Inventor: Theodore R. Gee, Jr., 917 North Pine, Ponca City, Okla. 74601

[21] Appl. No.: 882,131

[22] Filed: Jul. 3, 1986

[51] Int. Cl.[4] .............................................. A01K 5/00
[52] U.S. Cl. ..................................................... 119/60
[58] Field of Search ........................................... 119/60

[56] References Cited

U.S. PATENT DOCUMENTS 2,491,577 12/1949 Olinger ............................ 119/60 X
3,892,202 7/1975 Feterl ................................... 119/60
4,574,740 3/1986 Koebel ................................. 119/60

OTHER PUBLICATIONS

Linn Enterprises, Inc. Brouchere page labled 4/19/86 labled Stack Feeder.

Primary Examiner—William F. Pate, III
Assistant Examiner—Creighton Smith
Attorney, Agent, or Firm—William J. Miller

[57] ABSTRACT

A feeding apparatus has a floor with first and second sides, ends and a top. A side wall is attached to the floor and encloses the floor means with the side wall permitting limited access there through. Opposite ends of the side wall are pivotally secured so that they can be unlocked and opened thereby allowing a tractor to enter the enclosure for depositing hay within the enclosure. The remaining side wall is slidably attached in a manner to permit the side wall to urge toward the opposite side wall so that access can be had at all times to the hay contained therein as it is eaten by the animals.

4 Claims, 4 Drawing Figures

HAY FEEDING APPARATUS

BRIEF DESCRIPTION OF THE PRIOR ART

The best known prior art known to applicant is a stack feeder which can be erected around a stack by embedding three of the four sides in the dirt with at least one of the four sides having a rail along the top permitting movement of the rail toward the stack as it is eaten. Other forms of stack feeder are circular for accommodating cylindrical bales of hay.

BRIEF DESCRIPTION OF THE INVENTION

This invention provides a rugged haystack feeding arrangement which has a floor and four walls which permit feeding access through the wall or sides of the feeder. Opposite ends of the feeder are pivotally secured to one side of the feeder in a manner so that the opposite ends can be opened thereby permitting a tractor to enter the feeder and deposit a bale of hay which is carried on a separate trailer behind the tractor.

In the feeder, the side opposite the fixed side is mounted so that it can move toward the fixed side thereby permitting the continuous removal of hay be cattle. Once the immediate hay is removed, the pressure of the cattle will cause the side to move toward the fixed side thereby permiting the cattle to become closer to the hay confined in the feeder.

The apparatus also confines the hay as it collapses, thereby preventing the hay from falling onto the ground and being rendered uneatable by the cattle as they graze on the stacked hay. The feeder also protects the smaller cattle or calves from injury when the upper portion of the haystack collapses as it is eaten.

The above is accomplished by providing a rigid floor, substantial enough to accommodate a tractor pulling a trailer loaded with a haystack. One elongated side of the feeder is attached to the floor in a rigid manner with opposite ends pivotally attached to the rigid side wall. Means are provided to securely latch the pivoted ends so that the cattle can not enter either of the ends during the feeding process. The remaining side wall is attached through a telescoping arrangement to the floor of the feeder in a manner so that the weight of the cattle will cause the remaining side to be urged toward the haystack continuously during the feeding process thereby permitting the cattle to always be in contact with the hay confined within the feeder.

BRIEF DESCRIPTION OF THE FIGURES

FIG. 3 is a perspective view of a portion of the floor of the feeder illustrating the telescoping apparatus; and, FIG. 4 illustrates the operation of the feeder during the feeding process with cattle.

DETAILED DESCRIPTION OF THE INVENTION

Figure 1:
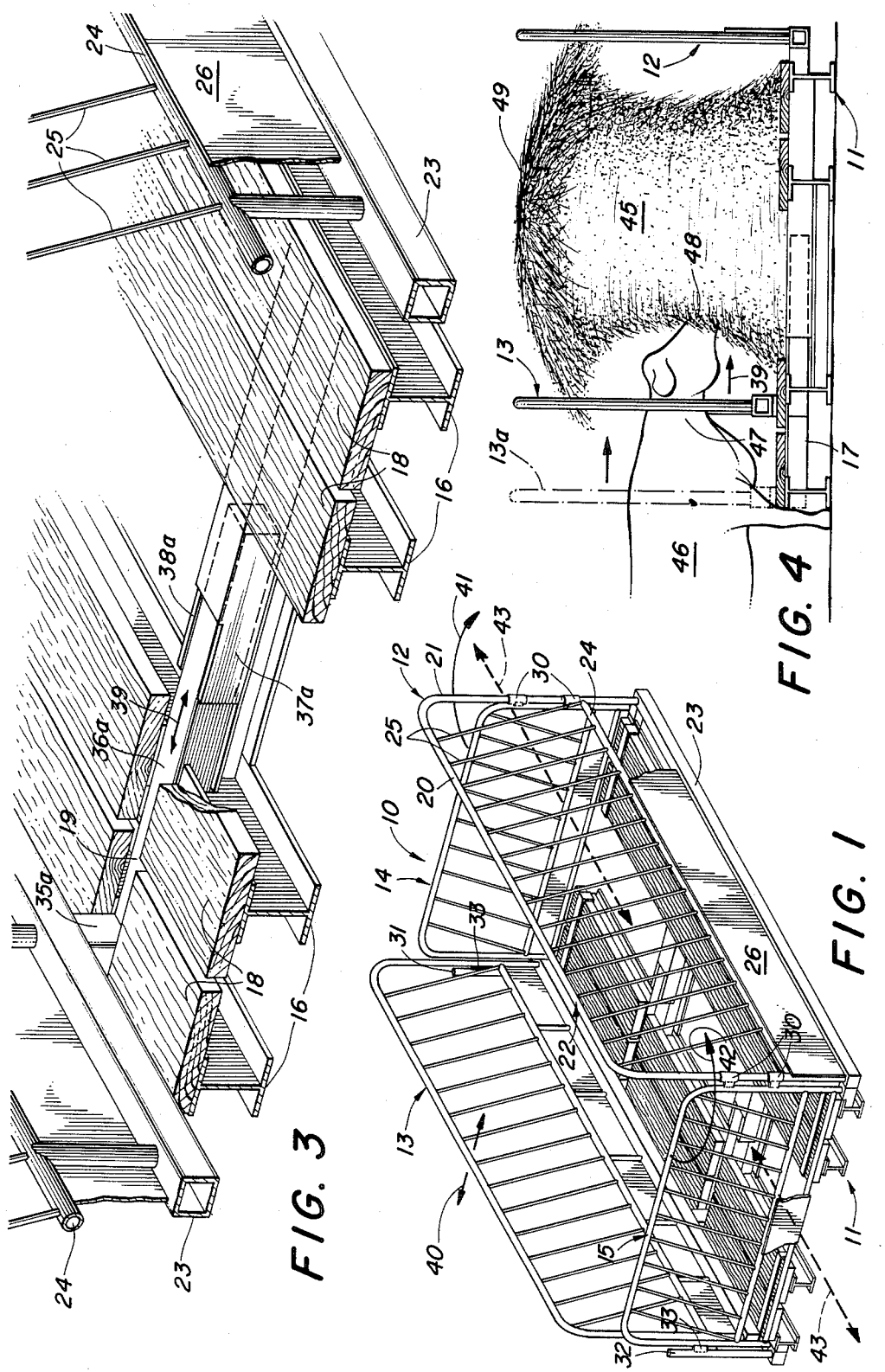
FIG. 1 is a perspective drawing of a feeding apparatus of this invention.

Referring to all of the FIGURES but in particular to FIG. 1, a feeder generally referred to by a number 10 has a bottom 11, a first rigid side 12, a second slidable side 13, a first pivotal end 14 and a second pivotal end 15.

Referring in particular to FIG. 3 the bottom is formed from a plurality of I-beams 16 welded together to form a rectangular structure slightly larger than the trailer used to haul or move a stack of hay. A plurality of cross-members made of C channel or I-beams 17 provide structural support for the bottom. A covering, such as boards 18, on each side of the floor provide support for the tractor and trailer that will enter the feeder during its normal use. While wood is illustrated in all of the FIGURES it is obvious that other materials can be used such as metal.

Beams 18 extend the full length of the feeder with slots illustrated by arrow 19 in a portion of the wood beams to accommodate the movement of side 13 toward side 12. Each side is generally composed of an upper tubular frame 20 and side frames 21 and 22 which are preferably made of tubular steel. In the embodiment constructed, side tubular portion 21, top tubular portion 20 and other side portion 22 are all form of a single tubular member bent at the appropriate locations to form sides 21 and 22.

A piece of channel iron 23 extends from side portion 22 to side portion 21 and is attached by means of welding to side portions 21 and 22. Side portion 23 is then rigidly secured to the side of bottom 11 by any usual means, such as welding or bolting. A tubular piece 24 extends between side portions 21 and 22 and is welded at each end to provide additional structure and a means to secure a plurality of angularly mounted bars 25, each of which are attached at top 20 and to tubular piece 24 in manner well known in the art. Such angular rods prevent the smaller cattle from jumping through and into the interior of the feeder and yet provide adequate opening space for the head of the cattle to enter the interior of the feeder for the purpose of the feeding. A "C" shaped channel member 26 is likewise attached between ends 21 and 22 and also to tubular portion 24 and provides strengthening as well as enclosing the bottom portion of the feeder.

Ends 14 and 15 are pivotally mounted through hinges 30 to sides 21 and 22. Post 31 and 32 are likewise attached to bottom 11 by means such as welding and each contains a latch 33 for securing ends 14 or 15 to post 31 and 32, respectively. Latch 33 provides a securing means for anchoring ends 14 and 15, thereby preventing cattle from dislodging the pivotal ends 14 or 15 during the eating process and physically entering the interior of the feeder.

Figure 2:
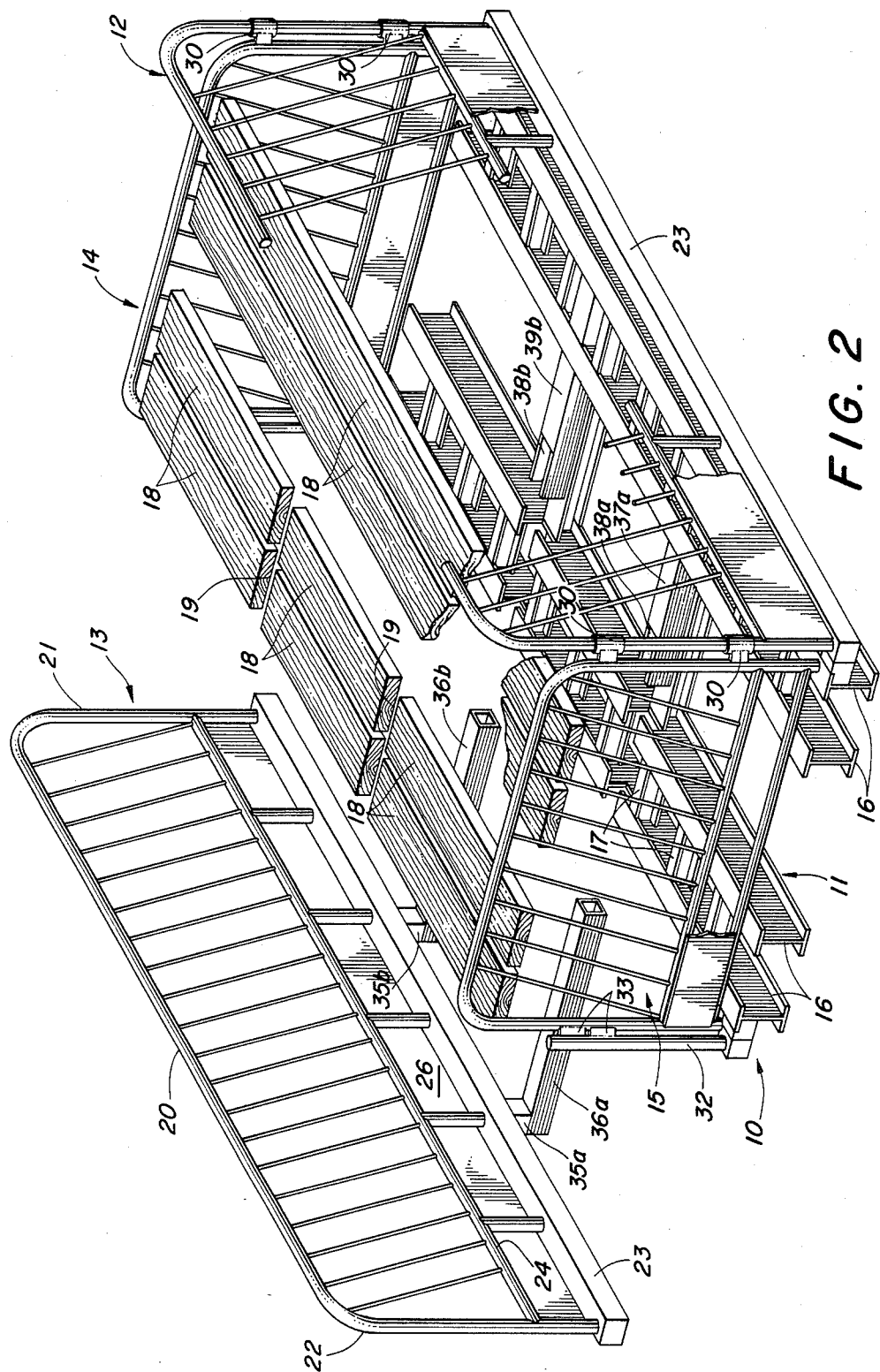
FIG. 2 is an expanded perspective drawing illustrating various elements comprising the feeder.

Side 13 is generally constructed the same as side 12 with the exception that it is slightly narrower than side 13 so that it can move within ends 14 and 15. If reference is made in particularly to FIG. 2, side 13 has a similar construction to that of side 12 and the same numbers are used for identical parts. In addition to the elements illustrated on side 12, side 13 has extensions 35a and 35b which connect to horizontal tubular members 36a and 36b, respectively. Cooperating tubular members 37a and 37b are mounted transverse to the longitudinal axes of bottom 11 and axially aligned with tubular members 36a and 36b in a manner so that the channel members 36a and 36b can fit within and slide within channel members 37a and 37b. Slots 38a and 38b are provided to permit additional movement of side 13 toward side 12, if desired. In normal use then, tubular member 36a will slide within tubular member 37a as illustrated by the arrow 39 in FIG. 3.

LOADING THE FEEDER

Referring in particular to FIG. 1, the feeder is loaded by making certain that side 13 is moved outwardly in the direction of arrow 40 until side 13 is substantially aligned with posts 31 and 32. Ends 14 and 15 are then unlatched at 33 and opened in the direction of arrows 41 and 42 along hinges 30 until ends 14 and 15 are at least parallel with side 12. Once the above is accomplished a tractor or other hauling device pulling a trailer containing the stack, enters along the direction of arrow 43, for example, and onto the beams 18 traveling the full length of feeder 10. The tractor will pass off of feeder 10 pulling the trailer onto the same beams 18. Once the hay stack trailer is fully within feeder 10, the unloading apparatus will deposit the hay stack onto the floor boards 18, as is well known in the art. Once the hay is deposited by the trailer being removed from under they hay, then ends 14 and 15 are again rotated to the closed position and latched at posts 31 and 32 by latches 33.

OPERATION

Referring in particular to FIG. 4 the operation can be observed. The haystack generally referred to by 45 is resting on bottom 11. Side 12 is, as previously discussed, the fixed side and side 13 is the moveable side. Side 13 is illustrated by dotted lines. Side 13 originally begins in the farthest position on floor 11. As a cow, for example, 46 removes the hay, the hay will continue to be eaten in the vicinity of side 13 and side 12. Once the hay has been substantially removed from side 13, for example, then the weight of the cows shoulders 47 pushing against side 13 will urge side 13 in the direction of arrow 39 causing side 13 to abut the side of stack 45. As the stack is eaten in the center portion referred by 48. Top 49 is generally prevented from falling since it will lean against side 13. If top 49 does fall, it will still be confined within the internal portion of the feeder and available for the cows to feed upon. It will not, as in the prior art devices, fall upon the ground where it is trampled and dirtied by the cattle.

CONCLUSIONS

A feeder has been described for accommodating large haystacks. It includes means for loading the feeder, for preventing the cattle from entering the interior portion of the feeder and damaging the stacks. It also provides a method for all of the stack to be eaten by the cattle during their feeding process. It is also obvious that while one side is illustrated as movable, both sides could easily be made movable and still be within the spirit and scope of this invention. The only modification that would be needed is the addition of posts, such as 32, to mount hinges 30 thereto, rather than hinging pivoted ends 14 and 15 to side 12.

It is obvious, of course, that other and modifications can be used and still be well within the spirit and scope of this invention as described in the specification and appended claims.

What I claim:

1. A feeding apparatus for animals comprising:
    (a) floor means having first and second oppositely spaced sides, first and second oppositely spaced ends and a top;
    (b) side wall means around said floor means thereby enclosing said floor means, said side wall means permitting limited access therethrough;
    (c) means for both pivoting and securing said side wall means enclosing both of said first and second oppositely spaced ends of said floor means; and,
    (d) means for slidably attaching at least one of said oppositely spaced side wall means to said floor means in a manner to permit movement of said slidably attached side wall means toward said remaining side wall means by pressure of said animals,
whereby when said animals press against at least one of said oppositely spaced side wall means, said side wall means will move toward said remaining side wall means.

2. Apparatus as described in claim 1 wherein one of said side wall means is rigidly secured to said floor means, and wherein said access means across the ends of said floor means are pivotally attached to each side of said fixed sidewall means.

3. A feeding apparatus for animals comprising:
    (a) a horizontally supported frame means having first and second sides, first and second ends;
    (b) first access means having a top, bottom and side members, said first access means having means for securing said first access means along its bottom to said first side to permit limited access to material placed upon said horizontal support frame means;
    (c) first and second gate access means having a top, bottom and sides, said first and second gate access means pivotally secured along said side members respectively of said first access means;
    (d) second access means; and,
    (e) means attached to said horizontal support frame means for slidably securing said second access means across said second side in a manner to cause said second access means to slide toward said first access means when animals press against said secured access means during feeding,
whereby material may be loaded on said horizontal support frame means by opening said first and second gate access means to permit moveable equipment to drive through said feeding apparatus and deposit said feed on said horizontal support means.

4. A feeding apparatus as described in claim 3 wherein means for securing said first access means comprises means for slidably securing said first access means along its bottom to said horizontal support frame means in a manner to cause said first access means to slide toward said second access means when said animals press against said first access means during feeding.

* * * * *